L. Fliedner.
Elastic Link for Clevis.

Nº 88,619.   Patented Apr. 6, 1869.

Witnesses:
J. H. Burridge.
Frank S. Alden.

Inventor:
Louis Fliedner.

LOUIS FLIEDNER, OF CLEVELAND, OHIO.

Letters Patent No. 88,619, dated April 6, 1869.

IMPROVEMENT IN ELASTIC LINK FOR CLEVIS.

The Schedule referred to in these Letters Patent and making part of the same.

*To all whom it may concern:*

Be it known that I, LOUIS FLIEDNER, of Cleveland, in the county of Cuyahoga, and State of Ohio, have invented a certain new and improved Elastic Link for Plow-Clevis; and I do hereby declare that the following is a full and complete description of the same, reference being had to the accompanying drawings, making part of this specification, in which—

Figure 1:
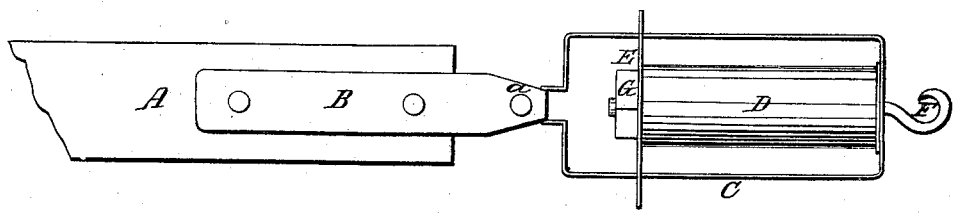
Figure 2:
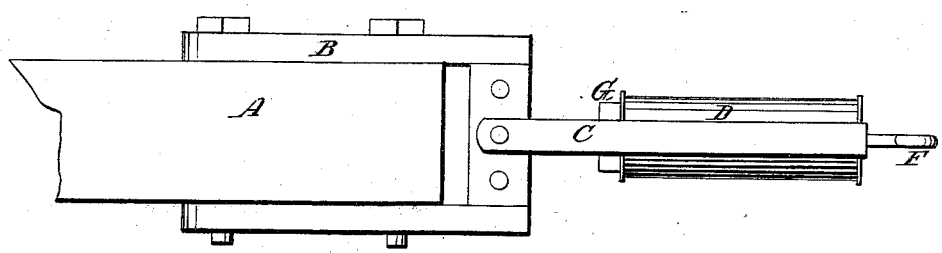

Figure 1 is a top view of the link.

Figure 2, side view.

Like letters of reference refer to like parts in the different views.

This invention has for its object the relief from sudden jar or strain upon the team, in consequence of the plow becoming suddenly arrested, by stones or roots, while being in use, thereby preventing the team from being injured, the harness and plow from being torn and broken.

In the drawing—

A represents the front end of the plow-beam, and

B, the clevis, both of which are or may be constructed in the ordinary way.

Attached to said clevis is a stay, or yoke, C, by means of the pin *a*.

D is a rubber spring, one end of which is secured to the adjustable cross-bar E, whereas the opposite one is attached to the end of the link.

Said cross-bar is fitted loosely in the yoke, so that it is allowed to move longitudinally therein, as will hereinafter be shown.

F is a hook, the stem of which penetrates and passes through the spring and cross-bar, and secured to said bar by a nut, G.

Having thus described the construction and arrangement of the link, or coupling, its practical operation and use will now be described.

It is well known to the practical farmer, that in plowing stony or rooty ground, the plow is often suddenly arrested in its course by contact with some hidden stone or root, the consequence of which is, that the plow-point is sometimes broken off, or other parts of the plow-gearing are more or less injured, and not unfrequently the harness is badly torn from the team, involving much loss of time, and consequent expense in the work of plowing.

Also the team, in consequence of such sudden stopping in their progress, receive injury in their shoulders, by the violence of the jerk and strain exerted upon them, which is of frequent occurrence in stony and rooty land. They become tender and sore, and therefore unable to work.

To avoid these accidents to the plow and harness, and injury to the team, is the purpose of this link, and to which the double-tree is attached, by means of the hook F.

Now, it will be obvious that if the team is suddenly stopped, in consequence of the plow being caught by a stone or root, the violence of the motion will be broken by the elastic and compressible nature of the spring D, upon which it will be received, as the draught of the team is exerted upon the hook, thereby compressing the spring more or less, as the strain thereon may be exerted.

It will be obvious that this yielding of the spring to the force of the arrested progress of the team and plow will prevent its expenditure upon the plow and shoulders of the horses, hence no breaking of the one, nor injury to the other will result. All will work freely and easily to the plow, team, and driver.

This link is equally applicable to all connections, when heavy draughts are made, and subject to sudden and violent activities, and for ordinary purposes, when an equal and steady motion is had, it is alike applicable and useful.

This link is neat in appearance, simple in its construction and arrangement, and, when properly made, is strong and durable.

What I claim as my invention, and desire to secure by Letters Patent, is—

The spring D, as arranged in combination with the adjustable cross-bar E, yoke, or frame C, and hook F, in the manner substantially as and for the purpose set forth.

LOUIS FLIEDNER.

Witnesses:
J. H. BURRIDGE,
FRANK S. ALDEN.